United States Patent [19]
Valihura, Sr.

[11] Patent Number: 5,974,936
[45] Date of Patent: Nov. 2, 1999

[54] METHOD TO ALLOW AN ALUMINUM BEVERAGE CAN TO BE RECYCLED

[76] Inventor: Robert J. Valihura, Sr., 12093 Old Stone Dr., Indianapolis, Ind. 46236

[21] Appl. No.: 08/826,013

[22] Filed: Mar. 27, 1997

Related U.S. Application Data

[60] Provisional application No. 60/014,513, Apr. 1, 1996.

[51] Int. Cl.$^6$ .......................................................... B26D 3/08
[52] U.S. Cl. ................................... 83/880; 83/51; 83/54; 83/454; 83/467.1; 83/761; 83/762
[58] Field of Search ................................ 83/762, 870, 54, 83/454, 467.1, 946, 761, 51; 82/92

[56] References Cited

U.S. PATENT DOCUMENTS

| | | |
|---|---|---|
| 2,477,493 | 7/1949 | Olson . |
| 2,679,274 | 5/1954 | Criner . |
| 2,685,901 | 9/1954 | Putzer . |
| 4,030,392 | 6/1977 | Torres ........................................ 83/178 |
| 4,320,680 | 3/1982 | de la Cruz et al. ...................... 83/870 |
| 4,884,328 | 12/1989 | Neighbors .............................. 29/401.1 |
| 5,205,195 | 4/1993 | Crosslen et al. ............................ 82/92 |

*Primary Examiner*—Peter Vo
*Assistant Examiner*—Kevin G. Vereene

[57] ABSTRACT

It is the purpose of this utility process invention to allow a means to recycle the common aluminum beverage can. This is accomplished with the addition of a scribe or scribes to the circumference of the can. The depth and position of the scribe acting as a pre-conditioner, weakening the can a specific amount in a specific location, there by allowing the desired or eventually desired separation at that specific location by secondary means if required. The scribe allows the can to be separated into cylindrical sections having a very smooth and accurate cut edge. These sections may be containers similar to a cup shape, sections with both ends of the can removed and sections with the can top removed. These scribes may or may not meet. Depending upon the eventual use, the sections may remain united. These scribes may be added any time during the can's life span either before opening or after opening and emptying the original contents. The scribe or scribes may be added at any location on the side wall height extending from beneath the can top lip to the bottom and on top near the edge. Said scribe may be added externally or internally to the can, internally allowable as the can is modified.

3 Claims, 3 Drawing Sheets

METHOD TO ALLOW AN ALUMINUM BEVERAGE CAN TO BE RECYCLED

This application claims benefit provisional application Ser. No. 60/014,513 filed Apr. 1, 1996.

CROSS-REFERENCE TO RELATED APPLICATION

U.S. Pat. Nos. 5,176,476 January 1995 Duffy 4,541,176 September 1985 Croce 3,741,142 June 1973 Stuard
Other
Article-Scientific American September 1994 "The Aluminum Beverage Can", Hosford and Duncan

STATEMENT REGARDING FEDERALLY SPONSORED RESEARCH OR DEVELOPMENT

Not applicable

REFERENCE TO A MICROFICHE APPENDIX

Not applicable

BACKGROUND OF THE INVENTION

One of the conveniences of modern life is the use of "throw away" containers (aluminum cans) in the packaging of beverages such as soft drinks, beer or other liquids. These two piece cans may now be manufactured so inexpensively that they are most often discarded after use or sold as scrap for $0.40 a pound where they are crushed and melted. Because they are so inexpensive they most often are thought as essentially worth less. The can's however are not "worthless" as in a handful of beach sand or a used tissue paper but embody a structure which if a practical means to section them could be found, would allow many reuses. In a recent article on the beverage can in Scientific American magazine by Hoseford and Duncan dated September 1994 it mentions that 300 million of these are manufactured every day, an annual rate of 100 billion or so! These are subsequently discarded as indicated above or by "the meaningful macho gesture of crushing an empty can with a bare hand". The article goes on to quote that these cans are not crude devices. In fact manufacturers of aluminum cans exercise the same attention and precision as do makers of the metal in an aircraft wing! It is there for the purpose of this instant invention to identify a practical method to perform and or to enhance the performance of precision can sectioning so that can sections may be used for other purposes.

One of the problems in attempting to precisely and cleanly section an empty aluminum can is that it is difficult to perform this activity with normally found tools and methods because of it's particular shape and structure. The thin walled can structure collapses under the action of a cutting tool such as a knife. When scissors are used a pierced hole must be used to insert the blade and as with the use of a saw an irregular cut edge results. Normally some backing surface is required in a precision cutting operation.

The aluminum beverage can has been over designed for the actual needs of the final consumerist. It has been designed for manufacturing practicability, such as automation and shipping in mind so that it can take the jostling of the production line, transportation impacts and stacking of the boxed beverages. In one reference it mentioned that the 12 ounce can could take 90 pounds internal pressure and quite often does on a hot day and 240 pounds externally before distorting. Quite often one may see these filled cans stacked twelve high on pallets for shipping. Once in the hands of the consumer or discarded however, some of this excess strength may be utilized by a controlled weakening step performed on the can in a sectioning process.

BRIEF SUMMARY OF THE INVENTION

The enclosed work concerns the use of a scribe around the circumference and or top of the can preferably before the can has been opened in order to weaken it to allow subsequent separation of the can along the scribe mark. It also may be re-pressurized to simulate an unopened can to allow the scribing activity as described here-in. The scribing activity is the novelty in this patent. Simple mechanism to accomplish this scribing action has been included in this patent and described below in the "DETAILED DESCRIPTION OF THE PREFERRED EMBODIMENT". It is not meant to imply that this is the only way to put a scribe on a can. No attempt has been made to cover all the ways to do this both by hand or automatically. It shows one simple way that works. In addition methods of separation of the can into sections has been included to use where necessary.

In this instant invention as indicated above, this weakening of the can is accomplished with the addition of a scribe or scribes to the circumference of the can surface and on the top near the can lip. The depth of the scribe may vary from a mere visible marking to completely through the can wall depending on scribe location and end results desired. The scribe acts as a pre-conditioner, weakening the can a specific amount in a specific location, there by allowing the desired or eventually desired separation at that specific location by secondary means if required. The scribe allows the can to be separated into cylindrical sections having a very smooth, precision, essentially non-hazardous cut edge which one would not expect with normally thought of methods. These sections may be tubular containers similar to a cup shape, tubular sections with both ends of the can removed, sections with the can top removed just under the lip and just inside the lip. With both ends removed precision, sheets of aluminum may be made by a perpendicular cut to the can section resulting in usable material available for projects. Crushing the can at this point allows a double thick piece of precision cut aluminum also available for projects. There are many uses for can sections once separated by the use of the scribe as an aid. Dolls made by combining sections and then decorating them. Also toys, a drinking utensil, a scupper for animals, a bird seed carrier and a plant starting pot to name a few. Using a whole wall of these sections would allow sound deadening.

These scribes may or may not meet. Depending upon the eventual use, the sections may remain united. These scribes may be added any time during the can's life span either before opening or after opening and emptying the original contents. The scribe or scribes may be added at any location on the side wall height extending from beneath the can top lip to the bottom and just inside the can top lip. Said scribe may be added externally or internally to the can, internally allowable as the can is modified. The may be a round shape and rotating independently of the can. A hard rubber type or other firm material may be used for a roller support.
Scribing mechanism The scribing mechanism described in detail below in the "DETAILED DESCRIPTION OF THE PREFERRED EMBODIMENT" may be thought of as a four sided box fixture with a bottom capable of holding an aluminum beverage can in a vertical position. Each of the sides of the fixture is of a different height and may be thought of as "steps" with each step wide enough to hold a scribing tool. Shims are placed beneath the can to bring it to an exact location between the "steps". In operation, a can is placed into the fixture with either end up. The scribing tool is then placed on the center area one of the steps with the sharpened edge of the scribing tool pressed against the can. It is at an angle of approximately 45 degrees and slightly forward of the center line where the can is tangent to the fixture wall. It is held in place with the fingers of one hand. The thumb applies pressure down wards so the scribe won't move once set in position. The index finger applies pressure against the "back" of the scriber to deflect the protective rubber at the scriber cutting tip and controls the depth of the scribe. The middle finger supports the rear of the scriber. The can is then rotated with the other hand in the direction of the 45 degrees (clockwise in this case) grasping the top of the can and in increments or a single motion and the scribe is applied around the circumference of the can. Different sizes of fixtures would be used for different sized cans with this simple concept. The can scriber shown here in may be thought as a generic can scriber as the components are simple. A can holder, a scriber and the realization that a full can is superior and that the separation step can allow a very accurate and smooth separation. As an example 3, 4, 5, 6, 7 or more sides could be used to surround the can. Also a horizontal platform suspended from a vertical shaft with a tight fitting hole for the can in effect allow infinite side height adjustment. The turning of the can could be rotated in the counter clockwise direction with the scribe safety rubber exchanged just opposite to that described earlier. The turning of the can could be powered in a more sophisticated model as well as securing the mounting of the scriber. Also the components in this design have the can on the vertical. They could just as well be mounted on the horizontal like a lathe.

Can separation

There are a number of ways suggested to separate the cans into sections if desired. These are offered as examples and should not thought to be inclusive. Processes not normally thought of as being precision may now in conjunction with the scribe result in a smooth clean cut, precision section. Some of the separation methods but by no means limiting are tearing, shearing, ripping, piercing, internal pressure and bending of the wall past the elastic limit or fatigue limit. The method used depends oil the preciseness of the cut edge desired and the depth of the scribe. If it is still unopened after scribing, the can should be opened and contents removed. Some of these sectioning concepts work better at the center of the can than at the ends. Also some of the methods allow both ends of the can to be used.

Once the critical weakening step of controlled scribing has been accomplished, if the separation of the can has not occurred, and if desecrate sections are desired then it may require a separate action. To perform the separation the can must first be emptied. The first method results in two usable sections from the can. In this approach, a deep scribe is made around the center section of the can closing on it's self. The can should be full during the scribing operation. After removal of the contents, separation is caused by "working" the scribe area a number of times all around the can periphery. This "working" of the scribe area may be likened to folding a piece of metal back and forth until it separates. Once started the separation begins at the most weakened area and then continues around the can until it meets the original separation point on the can. Two usable sections result from this action. This in and out motion along the can score may be accomplished by hand; one hand, compressing the can between the thumb and index finger at the scribe mark on the opposite sides of the can. The other hand holds the can securely while this operation is being performed. This activity is done in a sequencing motion around the can by alternately compressing the scribe with one hand followed by the opposite hand advancing around the can and re-grasping the can. This is then followed by release of the can by the initial hand and in turn advancing it around the can to perform another compression. It has been found that advancement step motion around the can of approximately 1-inch is satisfactory. The compression motion is approximately ⅛-inch going on simultaneously on opposite sides of the can. Going in too far will cause the can to totally collapse and not result in the desired separation. It has been found that rotating the can three times around appears adequate to cause the can to separate. The edges of the sections obtained by this method are smooth, free from burrs or sharpness and free from knife or scissors cuts. Mechanism could be readily built to accomplish this automatically but is not the purpose of this present invention.

In a second sectioning method, the empty can is returned to the can fixture. A locking jack knife is used to pierce in the can in a vertical manner until it just contacts the scribe mark. This should be done in the fixture at the level of the scribe. The second hand would hold the can in place. The knife is then turned to enlarge the hole and this action starts the separation action along the scribe. The knife and can may then be removed from the fixture and the knife removed from the can. With one hand holding the usable end section the thumb may be used to press on the started separation location and continue around the can until complete separation results. This method results on one usable section of because of the knife cut.

A third method results in one usable section of the can. The can is first placed in the fixture and the second hand holds the can in position by pressing on the top of the can. A horizontal cut or pierce is made with a knife such as a locking jackknife. This should be in the region of the can that is to be discarded approximately ½-inch above the scribe. The jackknife may be rotated to enlarge the hole for ease of entry of the scissors blade. Although not necessary four such holes spaced 90 degrees apart around the periphery will make the removal of this section easier. This section with the holes is subsequently removed by cutting with scissors between the holes and discarded. A second score mark may be made below the first scribe for uses later. This should be performed while the can is full or re-pressurized. To remove the section remaining above the scribe mark a 45 degree cut with scissors or shears is made from the cut edge of the can to the scribe. Using this cut section as a tab the section between the edge of the can and the scribe is removed by stripping it from the can. The direction and stripping time of this removal have been found to be critical. The stripping should be done in a direction perpendicular to the axis of the can. It should also be done quickly so the fracturing will follow the scribe. It may be done in steps.

BRIEF DESCRIPTION OF THE DRAWINGS

FIG. 1 is a perspective view of a workable can scribing device discussed here-in.

DETAILED DESCRIPTION OF THE PREFERRED EMBODIMENT

Figure 1:
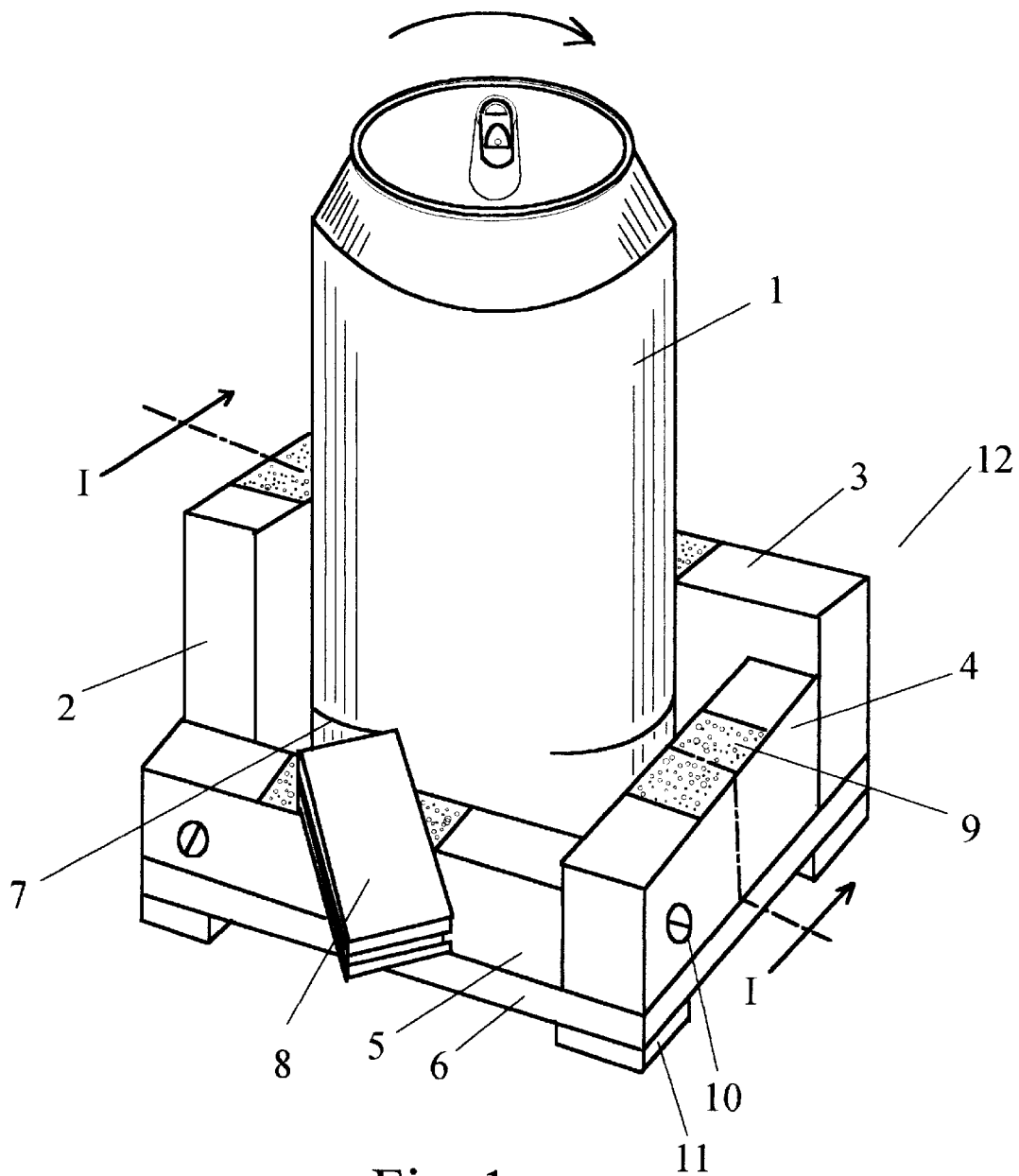

In FIG. 1, 1 is an aluminum beverage can in an unopened condition, with the top upwards confined by wooden steeped side walls 2, 3, 4, 5 and 6 a bottom structure which form a box like fixture with stepped sides. Parts 2, 3, 4, and 5 are arranged so that the can fits snugly but allows the can to be turned by a hand grasping the top of the can with the thumb and fingers downwards. Steeped side wall 2 has been made one half the height of the can to allow the can to be turned over thereby allowing scribing on the upper part of the can. It can be any can height. It would be made the height of the can if were one interested in scribing around the top inside edge of the can. In the current perspective the hand would be turning the can clockwise to allow a scribe 7 to be made around the can circumference. It is shown here only partially around the can. The bottom of the structure 6 which supports the can and does other functions shown in FIG. 2. The scriber 8 and shown in more detail in FIG. 3*a,* 3*b,* and 3*c*. To aid the scriber to be held in place, sand paper type material 9 is adhered to the center top area of steeped side wall each of 2, 3, 4, and 5. To hold the top structure together, comprised of 2, 3, 4, and 5, four wood screws 10 are used one in each corner. Four square pads of rubber 11 are used to keep the entire assemblage from moving while the scribe 7 is being made. These are placed in the four corners. In operation, the scriber 8 is placed at an angle of approximately 45 degrees on one of the sides so just the tip of scriber 8 is touching the can 1. The scriber is held down by the opposite hand doing the can turning. The thumb holds the scriber down while the index finger placed at the rear of the scribe applies the necessary pressure to perform the desired depth of the scribe. The middle finger supports the rear of the scribe in a horizontal position. The entire fixture is noted as 12.

Figure 2:
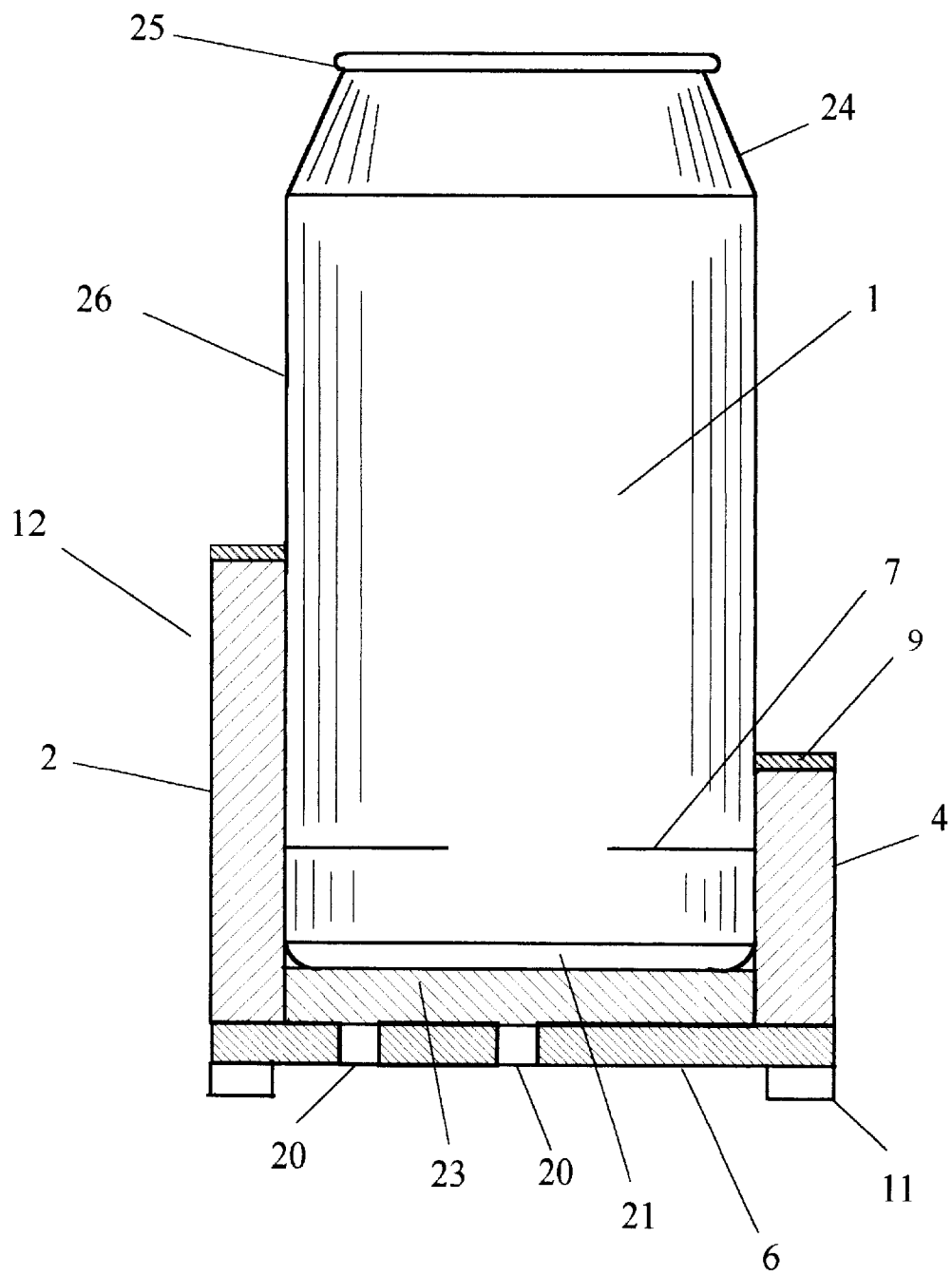
FIG. 2 is sectional view through the center of the apparatus. The can has been left whole to show the scribe.

In FIG. 2 is a cross section of the scribing apparatus at the center point except for the can 1 which has been shown as a whole so that scribe 7 could be shown. Steeped side walls 2, 3 and 5 are shown with 2 and 4 shown confining the can. The bottom 6 is shown secured to the walls by four small nails 27 with one nail on the center of each side. Shown in bottom structure 6 are two small holes 20 (approximately ⅛-inch in diameter) with one at the very center of the bottom. These are to allow holes to be drilled in the can bottom for attachment purposes of the sections. To enable this the empty can would placed on a surface with the bottom in the upward position. The fixture 12 would be placed over it in a upside position exposing, the holes 20 and allowing holes to be drilled in the can bottom 21 if desired. To raise and lower the can 1 to any desired height between the steeped side walls 2, 3, 4, and 5, shims 23 of various heights are used. These are made of wood or card board or a slippery material such as DuPont Corporations DELRIN (c) and are placed inside the fixture bottom 12 before placing the can in position. The tapered position of the can is 24 while the can lip is 25 and can side 26.

Figure 3A:
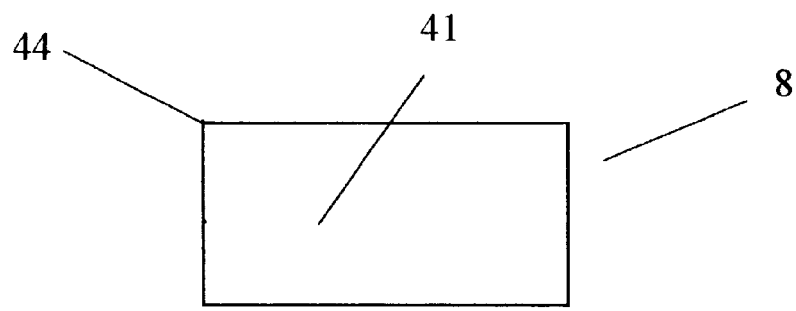
FIG. 3a is top view of the scriber device.
Figure 3B:
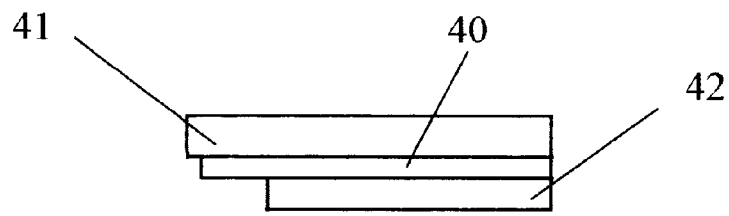
FIG. 3b is a bottom view showing the razor and protective rubber. This is the side that rests on the step.
Figures 3C, 3D:
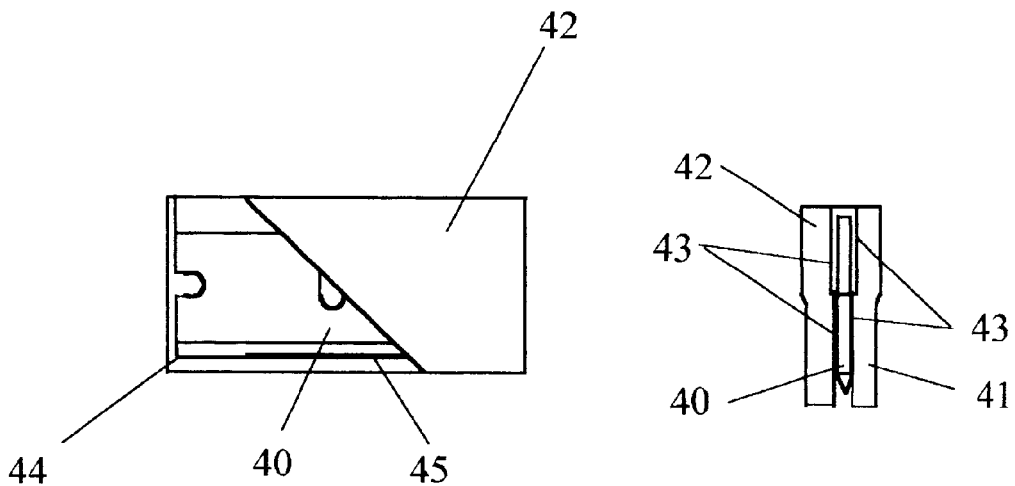
FIG. 3c is a cross sectional view of the scriber device.
FIG. 3D is an end view of the scribe tool showing the rubber jackets adhering to the blade with adhesive.

FIG. 3*a,* 3*b,* and 3*c* which comprise the scriber 8 is basically a sandwich of a common single edge razor blade 40 which has rubber jacket 41 and 42 adhered on each side for safety to the fingers. The center section of 40 showing the cutting edge 45 has been dulled except for a short section on either end of the cutting edge 45 leaving approximately ⅛-inch for cutting purposes. This is done for safety. The use of adhesive 43 in holding the rubber to the blade is to allow the cutting corner 44 to be reversed so both cutting corners of the blade may be used. FIG. 3*b* shows the rubber jacket 42 covering the razor 40 at an angle of approximately 45 degrees. This helps position the scriber on the step. The rubber over laps the razor blade by approximately ¹⁄₃₂-inch on the two end sides and the cutting edge. This is the side that is normally against the sand paper type material 9. The rubber is flush with the top of razor 40. Section 3*c* is at the scribing end. If desired, the 45 degrees cut of the rubber may be reversed which allows the can to be turned in the opposite direction.

I claim:

1. A method of scribing an aluminum beverage can within a fixture for the purpose of recycling, the method comprising the steps of:

providing four steeped side walls with a predetermined constant thickness, each of said side walls having a first surface and a second surface;

securing each first surface of said side walls on a periphery of a first surface of a square bottom structure, said bottom structure having four square rubber pads secured beneath each corner thereof;

assembling end portions of said walls together with four wood screws, thereby securing said side walls extending perpendicularly from said first surface of said square bottom structure and thereby creating a fixture having a square aperture between said side walls for positioning and holding a portion of an aluminum beverage can therein;

disposing at least one of a plurality of shims of selected height into said aperture;

adhering a non-abrasive side of a sand paper on each of said first surfaces of said side walls;

placing an aluminum beverage can onto said at least one of said plurality of shims disposed within said aperture;

positioning a scribe onto at least one abrasive side of said sand papers positioned on said top surfaces of said side walls so that said scribe contacting said aluminum beverage can, thereby marking said aluminum beverage can at a desired height thereof;

turning said aluminum beverage can relative to said fixture thereby circumferentially scribing said aluminum beverage can completely at said desired height.

2. The method of claim 1, wherein said scribe comprising a razor blade sandwiched with an adhesive between two rubber jackets.

3. The method of claim 1, further comprising providing said bottom structure with two small holes, at least one of said holes being positioned in the center of said bottom structure.

* * * * *